J. W. EDELL.
DETACHABLE LINING FOR BRAKE BANDS.
APPLICATION FILED SEPT. 2, 1919.
1,395,670.
Patented Nov. 1, 1921.
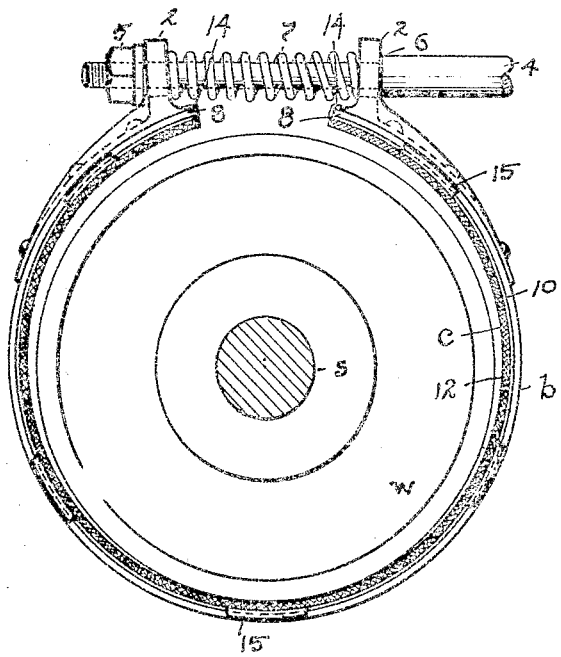
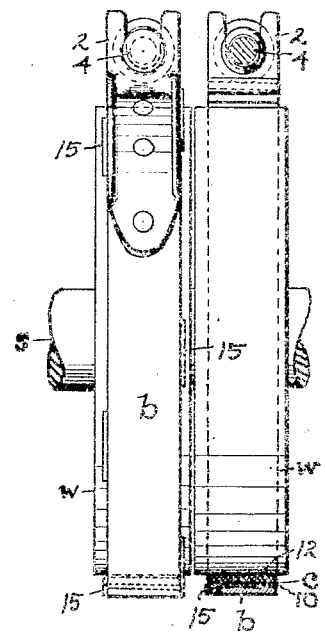
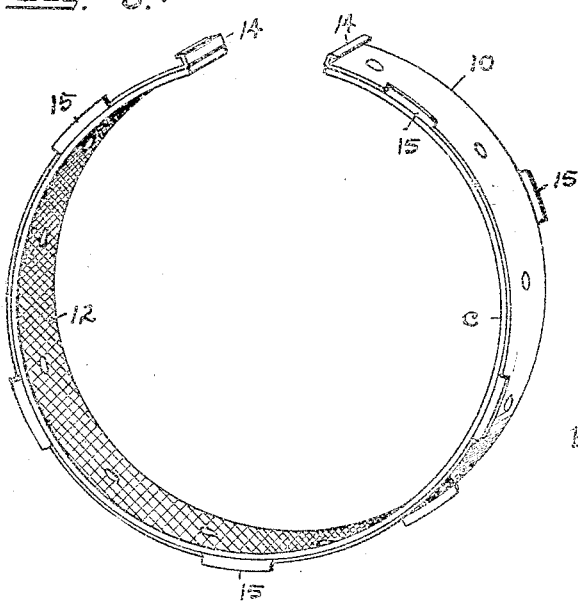
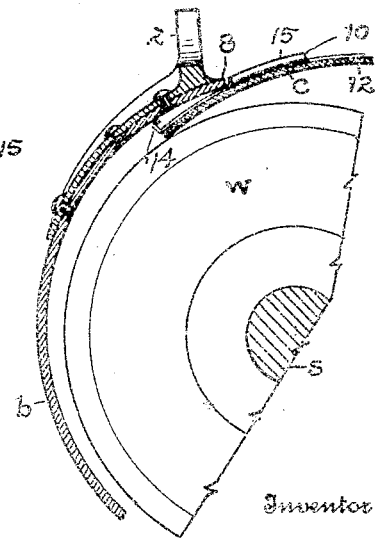
Inventor
Joseph W. Edell
Attorneys

UNITED STATES PATENT OFFICE.

JOSEPH W. EDELL, OF CLEVELAND, OHIO, ASSIGNOR OF ONE-HALF TO MICHAEL J. MARUNA, OF CLEVELAND, OHIO.

DETACHABLE LINING FOR BRAKE-BANDS.

1,395,670.   Specification of Letters Patent.   Patented Nov. 1, 1921.

Application filed September 2, 1919. Serial No. 321,021.

*To all whom it may concern:*

Be it known that JOSEPH W. EDELL, citizen of the United States, residing at Cleveland, in the county of Cuyahoga and State of Ohio, has invented certain new and useful Improvements in a Detachable Lining for Brake-Bands, of which the following is a specification.

This invention consists in a detachable lining for a friction brake or clutch band adapted to be employed especially in motor vehicles, all substantially as shown and described and more particularly pointed out in the claims.

In the accompanying drawings, Figure 1 is a side elevation of what may be regarded as a brake or clutch wheel, or its equivalent, fixed rigidly on a shaft and having my new and improved brake mechanism about the same. Fig. 2 is an edge view of two such wheels located side by side on the same shaft and showing the lining member sectioned off at top and bottom of the wheel at the right. Fig. 3 is a perspective detail of the lining member alone, and Fig. 4 is a side view of a portion of one of the brake wheels or sheaves and a section of the brake mechanism circumferentially and an end section of the lining member between said parts.

The complete structure as thus shown comprises the shaft *s*, the wheel or sheave *w* thereon, the brake band *b* and the so-called lining or friction member *c*, as a separate article of manufacture and sale.

For the purpose of the present description it may be assumed that the shaft *s* is a power driven shaft in an automobile or like vehicle in which one or more brake or like wheels are employed, and some such machines are known to employ two or three such wheels or clutch members on the same shaft. These usually are equipped with friction brake or clutch mechanism in which the band *b* is employed as the active medium for making the engagement.

The said band is adapted to encompass the wheel or drum except between its ends which are spaced apart a sufficient distance to provide for opening and closing in friction relations about the wheel, and said ends have lugs 2 standing outwardly therefrom and provided with open slots adapted to receive the reduced and partially screw-threaded end of the operating rod 4 therein. The said reduced end of the rod is secured by a nut 5 on its extremity bearing against the outer lug, while a shoulder 6 on said rod bears against the inner of said lugs or projections. A comparatively strong spiral spring 7 encircles said rod between said lugs and serves as a spreader of the ends of the band against the lugs, thus spreading the band and holding it normally out of brake relations. It will be noticed, also, that the said band *b* has slight terminal projections 8 outside said lugs, and the brake lining *c* as a distinct and separate embodiment comprises a sheet metal body 10 of band shape and a suitable frictional facing 12 on its insides, preferably of textile material and treated or otherwise made to afford good wearing and frictional qualities, but any suitable frictional facing may be employed. The part or body 10 is preferably of spring steel.

The said lining attachment is designed especially to be convenient for removal and replacement when worn or otherwise impaired for effective service, and to these ends is provided with a substantially hook-shaped lip 14 on each end by bending the extremity back upon itself outwardly so as to engage and lock upon the shoulders 8 on the ends of the brake band, as clearly seen in Fig. 1, and said body 10 is also provided with flanges 15 in staggered relations at intervals along its edges and adapted to bear against the edges of the band *b*, thus confining the said member or lining on said band and yet leaving it in shape to be easily removed and replaced by an unskilled person.

Now, assuming that the brake lining is to be removed for renewal, or repair or other cause, there are two ways in which this may be done, one of which is by pushing the lining around endwise within the brake band, but the preferable way is to remove the lining laterally. This is accomplished by first loosening the nut on the connecting rod 4, so as to permit the forked ends of the brake band to spring apart more or less as seen in Fig. 1, or to the maximum within the band casing, but without removing the rod from its seat. The coil spring 7 is then also relieved of tension and rests loosely on the rod. The next step is to release one end of the lining from the brake band and to shove said end back under the brake band which operates to release the other end from said band. Having thus released the ends of the lining a screw driver or the like is employed to work the lining forward circumferentially toward the open side of the brake band, with the clutch in neutral to permit the drum to be turned to facilitate the operation. This brings the lining to relations within the parts to work the same laterally from the drum for removal. In this operation the end of the lining is placed obliquely to the axis of the brake band until one hooked end is projected beyond or to one side of the outer edge of the brake band so as to clear the operating shaft and spring. The exposed end of the lining can then be grasped by the hand and the lining drawn out endwise with a direct pull.

The mode of operating the brake band and the working relation of the band to a housing or casing, or to other coacting parts of a machine, is not shown inasmuch as the invention resides more particularly in the flexible lining member with its holding lips and side guiding flanges, whereby replacements and repairs may be quickly effected without removing or dissembling the brake or clutch members from the shaft or housing.

What I claim is:

1. As a new article of manufacture, a lining for a brake band and the like having hook shaped ends adapted to engage over the ends of said band and projections along its edges adapted to bear against the edges of said band, and said lining faced with frictional material on its inner side.

2. As a new article of manufacture, a lining for brake bands and the like comprising a spring metal body of band shape having outwardly turned hooks at its ends and flanges staggered in respect to each other at its opposite edges and adapted to bear against the edges of the brake band.

3. A removable and replaceable clutch lining, comprising a flexible metal band having hooks at its opposite ends and guiding and holding lips in staggered relation on its opposite side edges.

Signed at Cleveland, in the county of Cuyahoga and State of Ohio, this 20th day of August, 1919.

JOSEPH W. EDELL.